United States Patent [19]

Archer

[11] Patent Number: 5,005,351

[45] Date of Patent: Apr. 9, 1991

[54] POWER PLANT CONDENSER CONTROL SYSTEM

[75] Inventor: David H. Archer, Ross Township, Allegheny County, Pa.

[73] Assignee: Westinghouse Electric Corp., Pittsburgh, Pa.

[21] Appl. No.: 484,750

[22] Filed: Feb. 26, 1990

[51] Int. Cl.$^5$ .............................................. F01K 13/02
[52] U.S. Cl. ........................................ 60/686; 60/661; 60/692; 60/657
[58] Field of Search ................ 165/11.1, 12; 60/686, 60/661, 692, 646, 657

[56] References Cited

U.S. PATENT DOCUMENTS

| | | | |
|---|---|---|---|
| 4,390,058 | 6/1983 | Otake et al. | 165/11.1 X |
| 4,768,346 | 9/1988 | Mathur | 165/11.1 X |

*Primary Examiner*—Allen M. Ostrager

[57] ABSTRACT

A system and method for controlling the operation of a steam condenser in a power plant which includes a steam turbine, the condense having: a steam flow path including a steam inlet connected to receive turbine exhaust steam from the turbine steam outlet, a condensate outlet and a heat exchange region located between the steam inlet and the condensate outlet; a cooling water flow path having an inlet and an outlet and heat exchange elements for conducting cooling water through the heat exchange region, and a non-condensible product removal path having an inlet communicating with the heat exchange region and an outlet located outside of the heat exchange region. Control is effected by: measuring fluid flow at the steam inlet, the condensate outlet, the cooling water inlet and the cooling water outlet; providing a computer model of the condenser in its normal operating condition, supplying the model with representations of the measured flows at the steam inlet and the cooling water outlet, and producing, in the model, indications of the flow at the condensate outlet and the cooling water outlet when the condenser is in its normal operating condition; comparing the indications from the producing step with the measured flow at one of the condensate outlet and the cooling water outlet from the measuring step; and effecting a computerized analysis of the result of the comparing step for providing an indication of the probable cause of differences between the compared indications and flows.

18 Claims, 2 Drawing Sheets

POWER PLANT CONDENSER CONTROL SYSTEM

BACKGROUND OF THE INVENTION

The present invention relates to the control of a condenser in a power plant steam generation system.

The condenser of a steam power generation system acts to condense steam exiting from the system output components, particularly the steam turbines, under such conditions that a low pressure is maintained in the steam leaving these components.

Proper operation and maintenance of the condenser have a significant influence on the effective operation of a steam power plant. For example, if the condenser does not create the optimum backpressure for the turbine outlet, the power output of the plant will be reduced. Thus, in a typical plant, a backpressure value which is 2.5 cm of Hg greater than optimum can reduce plant output by 1 percent; 5 cm of Hg greater than optimum can reduce plant output by 3 percent.

In addition, faults and breakdowns in the condenser systems of existing power plants are responsible for significant losses in plant availability each year.

Heretofore, it has been the practice in industry to monitor a number of condenser operating parameters, notably pressure and temperature, and possibly flow rate, at the inlet and outlet of the various flow paths in the condenser and to display the measured values to an operator who would then determine whether any corrective action, such as maintenance, repairs, or a flow adjustment, should be made.

However, it is frequently difficult for an operator to determine, based on the available data, the correct cause of a nonconforming measured value. In addition, a slight change in a measured value indicative of a deviation from optimum operating conditions can often be missed.

On occasion, even if the operator should correctly identify the cause of a problem, the time which this requires can result in damage being caused to the system before the appropriate corrective action has been taken.

SUMMARY OF THE INVENTION

It is an object of the present invention to monitor the operation of a steam plant condenser in order to maintain optimum operating conditions and reduce the total duration of plant outages for condenser repair or maintenance.

Another object of the invention is to produce automated diagnoses of deviations from optimum or proper condenser operations.

A method for controlling the operation of a steam condenser in a power plant which includes a steam turbine having a steam outlet, the condenser having: a steam flow path including a steam inlet connected to receive turbine exhaust steam from the turbine steam outlet, a condensate outlet and a heat exchange region located between the steam inlet and the condensate outlet; a cooling water flow path having a cooling water inlet, a cooling water outlet and heat exchange means for conducting cooling water through the heat exchange region from the cooling water inlet to the cooling water outlet, and a non-condensible product removal path having a product inlet communicating with the heat exchange region and a product outlet located outside of the heat exchange region, said method comprising:

measuring parameters representative of fluid flows at the steam inlet, the condensate outlet, the cooling water inlet and the cooling water outlet, and determining, on the basis of the measured parameters, the fluid flow rates at those inlets and outlets;

providing a computer model of the condenser in its normal operating condition, supplying the model with representations of the fluid flow rates at the steam inlet and the cooling water outlet, as determined by said determining step, and producing, in the model, indications of the flow rate at the condensate outlet and the cooling water outlet when the condenser is in its normal operating condition;

comparing the indications from said producing step with the flow rate at one of the condensate outlet and the cooling water outlet, as determined by said determining step; and effecting a computerized analysis of the result of said comparing step for providing an indication of the probable cause of differences between the compared indications and flow rates.

According to the invention, appropriate measurements are made at various flow path inlets and outlets, the inlet measurements are supplied to a computerized model of the condenser which produces signals indicating the conditions which will exist at the various path outlets of the condenser when it is in good working order and is operating properly. By comparing measured output values with the values represented by the signals produced by the model, information indicative of the operating state of the condenser is produced.

In order to utilize this information in an effective and reliable manner, the present invention provides a computerized diagnostic system which is constructed or programmed according to the principles of expert systems to analyze indications of differences from optimum output values and to provide identification of probable sources of malfunction and recommendations for the most appropriate corrective actions.

DESCRIPTION OF THE PREFERRED EMBODIMENTS

Figure 1:
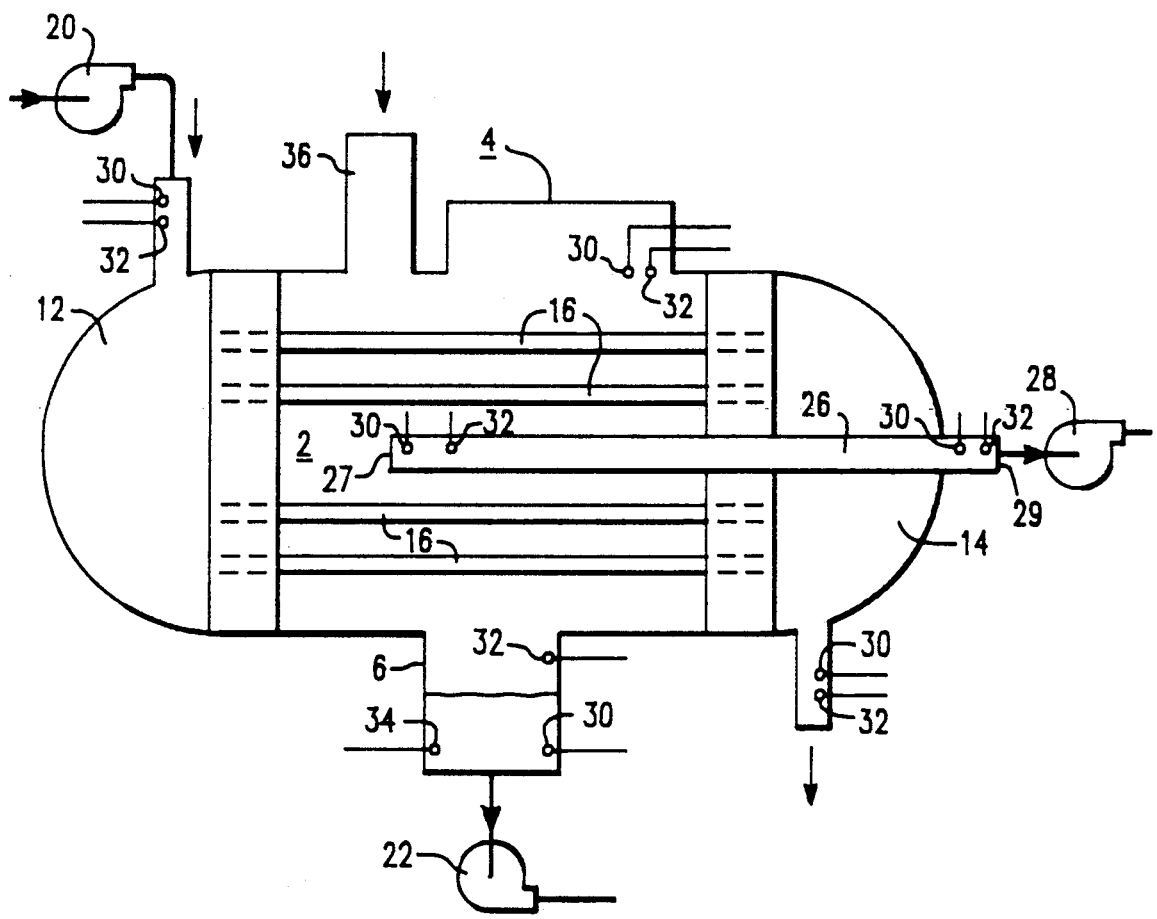
FIG. 1 is a pictorial view illustrating the basic structure of a condenser to be monitored according to the invention.

FIG. 1 is a simplified cross-sectional elevational view of a conventional steam plant condenser whose operation may be monitored and controlled according to the invention. Such a condenser performs an indirect heat exchange between steam flowing along a steam flow path from a turbine to a condensate region and cooling water flowing along a cooling water flow path.

The steam flow path includes a heat exchange region 2 located between a steam inlet 4 and a hot well 6. Steam inlet 4 is connected to receive steam of the outlet of the power plant turbine and hot well 6 is connected to return condensate for reuse as boiler feedwater.

The cooling water path includes an inlet manifold 12, an outlet manifold 14 and a plurality of tubes 16 connecting manifolds 12 and 14 for conveying cooling water through heat exchange region 2.

Region 2 is separated from manifolds 12 and 14 by suitable partitions.

Inlet manifold 12 is connected to a cooling water supply via at least one cooling water pump 20 and hot well 6 is connected to a boiler feedwater supply location via at least one condensate pump 22.

The condenser further includes a system for removing non-condensible components, e.g., air from the heat exchange region 2. This system is composed of one or more conduits 26 opening into region 2 on inlet 27 and one or more removal devices, such as a pump 28, at an outlet 29.

For monitoring condenser operation, the condenser is equipped with appropriately disposed temperature sensors 30 and pressure sensors 32, as well as at least one chemical sensor 34 for permitting measurement of condensate water quality.

Heat exchange region 2 is further provided with one or more inlets 36 connected to receive steam or a steam-condensate mixture from bypass lines, drain lines, etc., forming part of the steam flow system.

Figure 2:
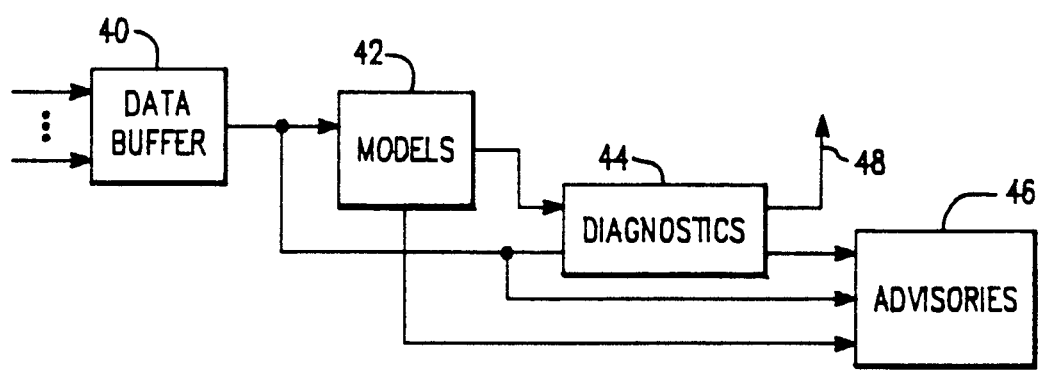
FIG. 2 is a block diagram of a system for monitoring a condenser in accordance with the invention.

FIG. 2 is a block diagram illustrative of a system for processing data produced by sensors 30, 32, 34, as well as other relevant data produced within the power plant, in order to inform supervisory personnel of the condenser operating state and of corrective actions which may be taken. This system may be created by programming a general purpose computer or by constructing a dedicated device to include a data buffer 40 connected to receive and temporarily store the data to be processed. This data is supplied at selected intervals to condenser computer models 42, diagnostic units 44 and a subsystem 46 for providing advisories.

In models 42, the anticipated responses of a properly functioning condenser are derived from measured input values and the resulting modeled outputs are compared in diagnostic units 44 with measured condenser output signals from buffer 40. The results of these comparisons can provide signals at an output 48 identifying specific condenser problems and, possibly, their causes. Finally, signals from buffer 40, models 42 and units 44 are supplied to subsystem 46 to permit the generation of operator advisories which inform operating personnel of adjustments which could restore optimum condenser operating conditions or compensate for minor malfunctions or conditions which do not require condenser shut-down. Examples of these functions will be described below.

A determination of the steam/condensate quantity, or flow, balance can be made by comparing $F_{in}$ with $F_{out}$, where $F_{in}$ is the mass flow of steam into region 2 via inlets 4 and 36 and $F_{out}$ is the mass flow of condensate out of hot well 6.

The component of $F_{in}$ associated with inlet 4 can be determined according to techniques currently employed to monitor steam turbine systems. This may be carried out by measurements of the flow of steam into the turbine and of steam extracted from the turbine to heat feedwater. The component associated with inlet 36 can be determined by any known technique, such as by installation of a flow meter. $F_{out}$ can be determined by means of a flow meter in the outlet line from hot well 6.

If $F_{in} > F_{out}$, this signifies a buildup of condensate in hot well 6. If the condensate level is observed to be increasing in the hotwell, this increase can be attributed to a failure of the level control system, a possible blockage in the outlet line from hot well 6, or a failure or malfunction of pump 22. On the other hand, if $F_{in} > F_{out}$ and the condensate level is observed to be constant or decreasing, then one or more of the flow measurements is suspect.

If $F_{in} < F_{out}$ and the condensate level in the hotwell is observed to be constant or increasing, this is evidence of a leak of cooling water into region 2 or of an error in one or more flow measurements.

It is expected that normally $F_{in} = F_{out}$ and this result coupled with the absence of any other fault indication, can serve as a confirmation of the consistency of the flow measurements being relied upon.

The pressure and temperature measurements at inlet 4 should correspond to those for saturated steam or else the measurements are suspect.

An energy balance exists between heat extracted from the steam ($Q_{outst}$) and the condensate ($Q_{outcon}$) and heat supplied to the cooling water ($Q_{in}$). Heat is transferred from the condensate to the cooling water as the condensate cascades downwards in region 2 over tubes 16 containing the cooling water, from the upper regions of the condenser to the hotwell. The balance, $$Q_{out} = Q_{outst} + Q_{outcon} = Q_{in}$$

is an indication of normal operation, while $Q_{out} \neq Q_{in}$ can be an indication of a leak of cooling water into region 2.

$Q_{in}$ can be determined as the product of: the temperature difference between water leaving manifold 12 and entering manifold 14; the cooling water flow rate, measured by a flow meter or other technique; and the specific heat of the cooling water. $Q_{outst}$ can be determined on the basis of a known function of flow rate, steam quality, and either the temperature or the pressure at inlet. $Q_{outcon}$ can be determined as a known function of condensate flow rate and temperature.

A condition which can have a significant influence on condenser operation is the presence of air in heat exchange region 2 due, for example to leakage from the environment. There, leaks can occur around seals associated with piping into the condenser. A sufficient quality of air in region 2 can form an air layer around tubes 16 or an air bubble, either of which will substantially impair heat transfer between the cooling water and the steam. Moreover, air leaking into region 2 raises the pressure therein.

The rate at which air flows into region 2 can be determined on the basis of pressure and temperature measurements at inlet 27 and outlet 29 of non-condensible removal line 26. The vapor, or steam, partial pressure can be calculated on the basis of its known relation to temperature. Then the air partial pressure at inlet 27 can be determined as the difference between the pressure measured at inlet 27 and the calculated steam vapor pressure corresponding to the temperature at inlet 27. The calculated air partial pressure value then can be used to directly determine air content in the gas flow into the non-condensible removal line, from which an inference can be drawn, in units 44, as to the existence and severity of an air leak. Specifically, the molar ratio of air present to the steam is equal to the ratio of air partial pressure to water vapor pressure at inlet 4.

The magnitude of the air leakage can be determined by monitoring the mass flow rate through conduit 26, which increases in proportion to the quantity of air delivered to region 2. Flow is proportional to the square root of the pressure differential between the inlet 27 and outlet 29 of conduit 26, which can be determined on the basis of pressure measurements at those points. Flow is also a known function of the energy supplied to, and the pressure rise across, pump or injector 28. Flow values determined by these two procedures can be used to determine consistency of measurements and flow value trends are monitored in units 44 to identify development of leaks.

A highly reliable manner of detecting leaks between the cooling water flow path and the steam flow path is to monitor dissolved solids, in the form of ions, in the cooling water and in the condensed steam, or feedwater, together with the mass rate of flow of feedwater from hot well 6. Then, the mass rate of leakage flow can be determined as follows:

$$F_L = \frac{C_{fw} \times F_{fw}}{C_{cw}},$$

where
$C_{fw}$ is the concentration of ions in the condensed steam;
$F_{fw}$ is the flow of feedwater from the condensing region;
$F_L$ is the leakage flow from the cooling water to region 2; and
$C_{cw}$ is the concentration of ions in the cooling water.

The presence of air leaks can also be indicated by observing the concentration of dissolved oxygen in the condensate in hot well 6. For this purpose, the temperature in the hot well is measured, the oxygen partial pressure over the hot well is determined on the basis of its known relation to the oxygen concentration measured in the hot well. This oxygen partial pressure can be compared with the non-condensible, air, partial pressure determined at the inlet 27 to the non-condensible removal system 26, 28; presumably this oxygen partial pressure should be significantly less than 1/5 the non-condensible pressure. Such information is of importance because dissolved oxygen is a significant cause of corrosion.

According to the invention, models 42 and units 44 cooperate to provide indications of fouling within conduits 16. Such fouling reduces the rate at which heat can be transferred to the cooling water, by reducing both the heat transfer coefficient associated with the conduit walls and the rate of cooling water flow.

The occurrence of fouling can be determined by comparing the actual heat transfer coefficient, $U_{act}$, of conduits 16 with the desired coefficient, $U_{Des}$, produced in models 42 on the basis of measured values derived when the conduits are known to be free of fouling. Specifically, values for U can be determined on the basis of the following equations:

$$U = \frac{Q_{in}}{A \, \Delta T_{LM}},$$

$$\Delta T_{LM} = \frac{(T_{ST} - T_{cwin}) - (T_{ST} - T_{cwout})}{\ln((T_{ST} - T_{cwin})/(T_{ST} - T_{cwout}))}$$

where
A is the heat transfer area of tubes 16 and has a fixed value,
$T_{ST}$ is the measured steam temperature at inlet 4 and is assumed to remain constant in region 2,
$T_{cwin}$ and $T_{cwout}$ are the measured cooling water temperatures at the inlet to manifold 12 and the outlet from manifold 14, respectively, and ln = natural log.

$U_{act}$ is determined continuously in models 42 and the resulting value for $U_{Des} - U_{act}$ is determined and supplied to units 44 which provide diagnoses on the basis of the present difference value and changes in the difference value with time. These results can also provide indications of the presence of impurities in the cooling water. The change in the difference value with time can be evaluated with the indications relating to air content in region 2 and/or to the pressure drop, $\Delta P$, between inlet manifold 12 and outlet manifold 14 to provide a diagnosis of the presence of an air layer around tubes 16 or tube blockage.

Changes in the rate of cooling water flow or blockage of flow tubes 16 can also be inferred on the basis of the cooling water pressure differential, $\Delta P$, between inlet manifold 12 and outlet manifold 14. Again, a desired value, $\Delta P_{Des}$ is determined initially in models 42, the actual value, $\Delta P_{act}$, is derived continuously on the basis of actual pressure measurement, and the values of the difference $\Delta P_{act} - \Delta P_{Des}$ are supplied to units 44 where diagnoses are derived on the basis of the present difference value and changes in the difference value with time.

The two sets of values described above can also be compared to provide information indicative of instrument consistency.

An indication of condenser operating effectiveness can be obtained by comparing the backpressure on the turbine, measured at inlet 4, with the optimum value which maximizes a net plant power, i.e., the generator output minus the power input to the condenser system auxiliary pumps and fans.

In addition, the operation of the condenser auxiliary pumps and fans—particularly the number operating in parallel—can also be considered and adjusted to maximize the net plant power output. Too high a backpressure reduces the expansion ratio of steam in the turbine and correspondingly reduces the power output. Too low a backpressure corresponds to high cooling water and non-condensible pumping rates which consume power with no corresponding increase in turbine generator output. Sonic flow in the turbine exhaust limits the effect of lowering backpressure on the power output. Thus, an indication of low backpressure can produce an advisory to reduce cooling water flow rate and a high backpressure might call for an advisory to increase flow rate. The cleanliness of the condenser tubing, the lack of obstructions to water flow, the absence of air and cooling water leaks into condensing region 2 are also important in establishing optimal condenser operation. Finally, the level of condensate in the hot well 6, the uniformity of temperature there, and the correspondence of temperature with the vaporization temperature corresponding to the condenser pressure is an important indication of optimal, effective condenser operation. The hot well water level must be sufficiently high to provide a reservoir of condensate for use as boiler feed water and a head pressure for the condensate pump suction, but sufficiently low to prevent submergence of or splashing on condenser tubing. The condensate temperature should be close to the saturation value. (Higher temperature are technically impossible.) Lower temperature values indicate excessive cooling of the condensate and usage of cooling water in various regions of the condenser, requiring additional heat to preheat the condensate.

In further accordance with the invention, models 42 and units 44 are employed to provide indications of the operating states of pumps or ejectors, 20, 22 and 28. For each of these devices, measurements are made of fluid flow, inlet-outlet pressure differential, work, or energy, supplied to the device, and inlet-outlet temperature differential. These measurements can be combined according to known relationships, and the results compared, to provide indications of the consistency of sensor readings and of device malfunctions.

The flow, pressure differential, and work values at a given time can be compared with pump curves to determine whether the pump performance is deteriorating due to impeller wear, deposit formation, or liquid cavitation. The temperature differential across the pump can be compared to that predicted by the energy balance and the measured work input to the pump to determine whether pump, bearing, or motor problems are developing.

Sensor consistency indications can also be provided by effecting appropriate comparisons between the values provided by pressure drop sensors and flow rate sensors in various connecting lines.

Equipment malfunction indications can further be provided by appropriate comparisons between measured flow rate, pressure drop and temperature differential values associated with various bypass paths of the condenser system.

As mentioned earlier herein, the condenser backpressure, i.e., the pressure at inlet 4, has a measurable, and possibly significant, effect on the output of a power plant. In a system according to the invention, units 44 can respond to a deviation of that pressure from its optimum value together with other indications of equipment faults, e.g., leaks or tube fouling, to arrive at a diagnosis of the probable cause of such backpressure deviation. Depending on the cause identified, units 44 will provide signals on output 48 identifying the probable cause and will operate subsystem 46 to produce advisories of appropriate corrective action.

For example, if the diagnosis is that an air leak exists, but it is desired to not shut down the condenser system or the plant for repairs, an advisory may be given that it is advisable to make a temporary correction by increasing the speed of pump 28 or the number of pumps operating in parallel. Similarly, a diagnosis of a water leak can lead to an advisory to increase the degree of water treatment and to inspect and plug tube leaks; and a diagnosis of tube fouling can generate an advisory to increase the speed or pump 20 and/or an advisory that tube fouling has reached a point at which it is economically desirable to perform a cleaning operation.

Other diagnoses can lead to an advisory that various off-line testing and/or maintenance operations should be performed.

Figure 3:
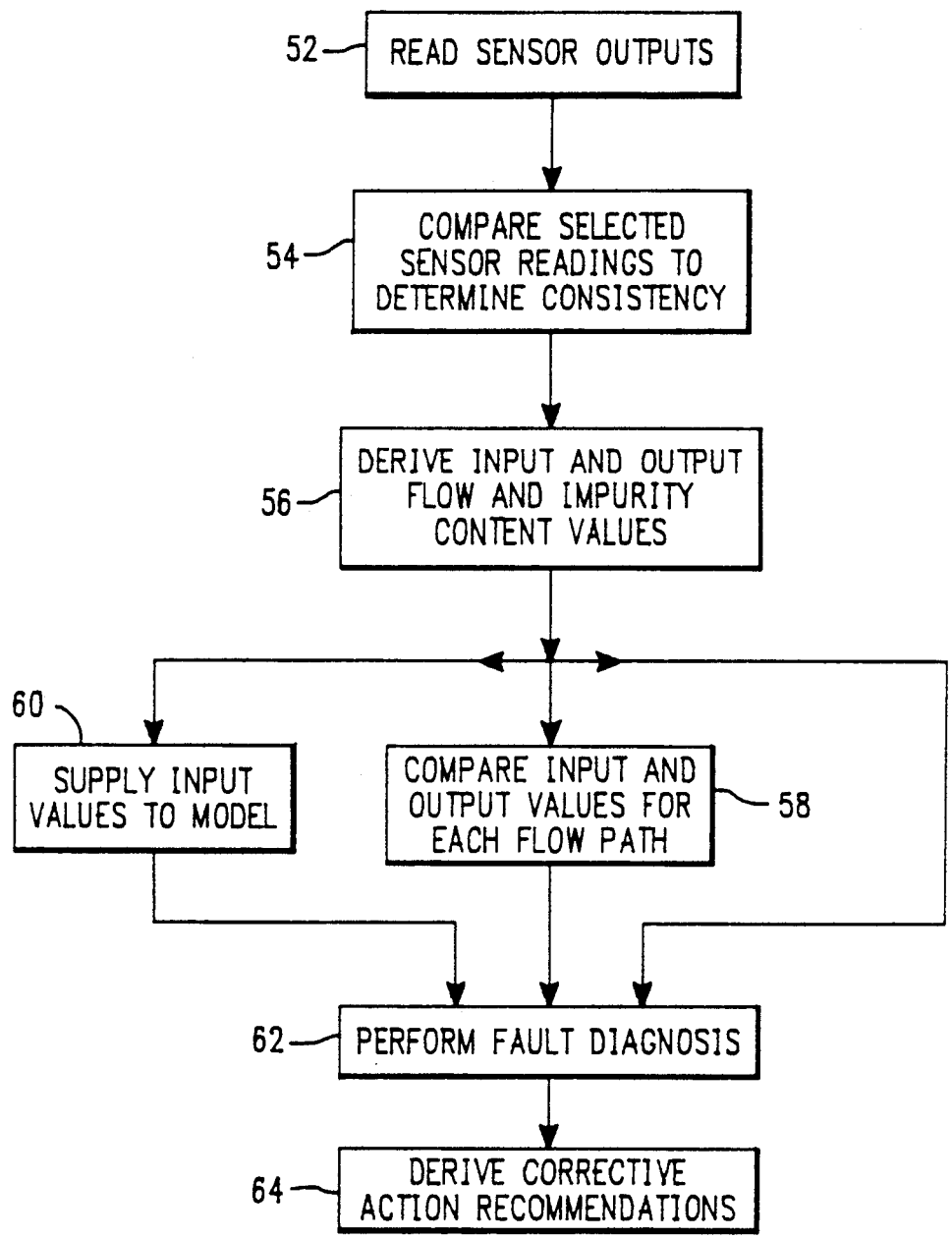
FIG. 3 is a flow diagram illustrating a monitoring operation according to the present invention.

The operation of a monitoring system according to the present invention is further depicted in the flow diagram of FIG. 3 which represents a framework for the programming of a general purpose computer to implement the invention. The first operation, typically, would be the reading of all sensor outputs, as indicated at function block 52. Then, in function block 54, appropriately selected outputs are compared to determine sensor consistency. This represents a conventional operation employed in expert systems to determine whether, and to what extent, reliance can be placed on individual sensor readings. Once satisfactory consistency has been indicated, the sensor outputs are combined on the basis of known relationships to derive input and output flow and impurity content values for each flow path. In the context of the present invention, impurities would include dissolved solids and/or ions.

Then, in function block 58, input and output values for each flow path are compared. These input and output values include not only flow values, but also pressure and temperature values which serve to provide heat transfer information. Then, in function block 60, sensed and/or derived input values are supplied to the condenser model which produces output values corresponding to a properly operating system. The results obtained in function blocks 56, 58 and 60 are supplied to function block 62, where fault diagnosis is performed. If any fault diagnosis indication is produced, this is supplied to function block 64 which will derive corrective action recommendations based in part on expert knowledge incorporated into the system.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for controlling the operation of a steam condenser in a power plant which includes a steam turbine having a steam outlet, the condenser having: a steam flow path including a steam inlet connected to receive turbine exhaust steam from the turbine steam outlet, a condensate outlet and a heat exchange region located between the steam inlet and the condensate outlet; a cooling water flow path having a cooling water inlet, a cooling water outlet and heat exchange means for conducting cooling water through the heat exchange region from the cooling water inlet to the cooling water outlet, and a non-condensible product removal path having a product inlet communicating with the heat exchange region and a product outlet located outside of the heat exchange region, said method comprising:

measuring parameters representative of fluid flows at the steam inlet, the condensate outlet, the cooling water inlet and the cooling water outlet, and determining, on the basis of the measured parameters, the fluid flow rates at those inlets and outlets;

providing a computer model of the condenser in its normal operating condition, supplying the model with representations of the fluid flow rates at the steam inlet and the cooling water outlet, as determined by said determining step, and producing, in the model, indications of the flow rate at the condensate outlet and the cooling water outlet when the condenser is in its normal operating condition;

comparing the indications from said producing step with the flow rate at one of the condensate outlet and the cooling water outlet, as determined by said determining step; and generating, on the basis of the result of said comparing step, an indication of differences between the compared indications and flow rate.

2. A method as defined in claim 1 wherein said step of comparing is carried out automatically under computer control.

3. A method as defined in claim 2 wherein said step of determining comprises making a computerized determination of the relation between fluid flows at the inlet and outlet of one of the steam flow path and the cooling water flow path in order to identify leaks into the steam flow path.

4. A method as defined in claim 3 wherein said step of making a determination is carried out by comparing the mass flow rates at the inlet and outlet of one of the steam flow path and the cooling water flow path.

5. A method as defined in claim 3 wherein said step of making a determination is carried out by comparing the concentrations of a dissolved impurity at the inlet of one of the steam flow path and the cooling water flow path and at the outlet of the other one of the steam flow path and the cooling water flow path.

6. A method as defined in claim 2 wherein said step of generating is carried out for providing an indication of the presence of air in the heat exchange region.

7. A method as defined in claim 2 wherein said step of generating is carried out on the basis of the measured flows at the inlet and outlet of the cooling water flow path and the indication produced in the model of the flow at the cooling water outlet for providing an indication of fouling in the heat exchange means.

8. A method as defined in claim 2 wherein said step of generating is carried out to provide an indication of the deviation between actual operation and optimum operation of the condenser.

9. A method as defined in claim 2 wherein the power plant further has at least one pump connected for conveying fluid along one of the paths, and said step of generating is carried out for providing an indication of the operating state of the pump.

10. A system for controlling the operation of a steam condenser in a power plant which includes a steam turbine having a steam outlet, the condenser having: a steam flow path including a steam inlet connected to receive turbine exhaust steam from the turbine steam outlet, a condensate outlet and a heat exchange region located between the steam inlet and the condensate outlet; a cooling water flow path having a cooling water inlet, a cooling water outlet and heat exchange means for conducting cooling water through the heat exchange region from the cooling water inlet to the cooling water outlet, and non-condensible product removal path having a product inlet communicating with the heat exchange region and a product outlet located outside of the heat exchange region, said system comprising:

means disposed for measuring parameters representative of fluid flows at the steam inlet, the condensate outlet, the cooling water inlet and the cooling water outlet, and for determining, on the basis of the measured parameters, the fluid flow rates at those inlets and outlets;

means defining a computer model of the condenser in its normal operating condition, the model being supplied with representations of the fluid flow rates at the steam inlet and the cooling water inlet, as determined by said measuring means, for producing indications of the flow rate at the condensate outlet and the cooling water outlet when the condenser is in its normal operating condition;

means connected for comparing the indications from said model with the flow rate at one of the condensate outlet and the cooling water outlet from said measuring means; and means connected for generating, on the basis of the comparison result produced by said comparing means an indication of differences between the compared indications and flow rate.

11. A system as defined in claim 10 wherein said comparing means operate automatically under computer control.

12. A system as defined in claim 11 wherein said measuring means comprise computer means for determining the relation between fluid flows at the inlet and outlet of one of the steam flow path and the cooling water flow path in order to identify leaks into the steam flow path.

13. A system as defined in claim 12 wherein said computer means are operative for comparing the mass flow rates at the inlet and outlet of one of the steam flow path and the cooling water flow path.

14. A system as defined in claim 12 wherein said computer means are operative for comparing the concentrations of a dissolved impurity at the inlet of one of the steam flow path and the cooling water flow path and at the outlet of the other one of the steam flow path and the cooling water flow path.

15. A system as defined in claim 11 wherein said means for generating are operative for providing an indication of the presence of air in the heat exchange region.

16. A system as defined in claim 11 wherein said means for generating are responsive to the measured flows at the inlet and outlet of the cooling water flow path and the indication produced in the model of the flow at the cooling water outlet for providing an indication of fouling in the heat exchange means.

17. A system as defined in claim 11 wherein said means for generating are operative for providing an indication of the deviation between actual operation and optimum operation of the condenser.

18. A system as defined in claim 11 wherein the power plant further has at least one pump connected for conveying fluid along one of the paths, and said means for generating are operative for providing an indication of the operating state of the pump.

* * * * *